US009489505B2

(12) United States Patent
Heider

(10) Patent No.: US 9,489,505 B2
(45) Date of Patent: Nov. 8, 2016

(54) METHOD FOR DISPLAYING INFORMATION ON A DISPLAY DEVICE OF A TERMINAL

(75) Inventor: Axel Heider, München (DE)

(73) Assignee: Trustonic Limited, Cambridge (GB)

( * ) Notice: Subject to any disclaimer, the term of this patent is extended or adjusted under 35 U.S.C. 154(b) by 0 days.

(21) Appl. No.: 14/113,066

(22) PCT Filed: Apr. 19, 2012

(86) PCT No.: PCT/EP2012/001700
§ 371 (c)(1),
(2), (4) Date: Oct. 21, 2013

(87) PCT Pub. No.: WO2012/143132
PCT Pub. Date: Oct. 26, 2012

(65) Prior Publication Data
US 2014/0041050 A1    Feb. 6, 2014

(30) Foreign Application Priority Data
Apr. 21, 2011 (DE) .................. 10 2011 018 431

(51) Int. Cl.
*G06F 7/04*    (2006.01)
*G06F 17/30*    (2006.01)
(Continued)

(52) U.S. Cl.
CPC ............ *G06F 21/44* (2013.01); *G06F 21/64* (2013.01); *G06F 21/84* (2013.01); *H04L 63/12* (2013.01); *H04M 1/72522* (2013.01); *H04W 12/10* (2013.01); *H04W 12/12* (2013.01)

(58) Field of Classification Search
CPC ............................... G06F 21/84; G06F 21/74
USPC ........................................................ 726/27
See application file for complete search history.

(56) References Cited

U.S. PATENT DOCUMENTS 5,001,742 A    3/1991    Wang
7,809,875 B2    10/2010    Sundaram et al.
(Continued)

FOREIGN PATENT DOCUMENTS

CN    1813244    8/2006
CN    101078922    11/2007
(Continued)

OTHER PUBLICATIONS

English translation of Chinese Office Action dated Aug. 6, 2014 in CN 201280018611.8, 9 pages.
(Continued)

*Primary Examiner* — Christopher Revak
*Assistant Examiner* — Vadim Savenkov
(74) *Attorney, Agent, or Firm* — Nixon & Vanderhye P.C.

(57) ABSTRACT

The invention relates to a method for displaying information on a display device (D1, D2) of a terminal, particularly a mobile terminal, wherein the terminal contains a microprocessor unit in which a normal runtime environment (NZ) and a protected runtime environment (TZ) are implemented, wherein display data (DD1, DD2, DD2', TDD2) can be provided for reproduction on the display device (D1, D2) by means of the normal runtime environment (NZ) and the protected runtime environment (TZ). In this case, at least some display data (DD2) provided by means of the normal runtime environment (NZ) are transferred to the protected runtime environment (TZ), which checks whether the transferred display data (DD2) satisfy one or more security criteria, wherein if they do not satisfy at least one security criterion then the display data (DD2) are rejected or are altered such that they can be distinguished from display data (TDD2) provided by means of the protected runtime environment (TZ) when they are next reproduced on the display device (D1, D2).

12 Claims, 1 Drawing Sheet

(51) Int. Cl.

| | | |
|---|---|---|
| H04N 7/16 | (2011.01) | |
| G06F 21/44 | (2013.01) | |
| G06F 21/84 | (2013.01) | |
| H04L 29/06 | (2006.01) | |
| H04M 1/725 | (2006.01) | |
| H04W 12/10 | (2009.01) | |
| H04W 12/12 | (2009.01) | |
| G06F 21/64 | (2013.01) | |

(56) References Cited

U.S. PATENT DOCUMENTS

| | | | |
|---|---|---|---|
| 8,122,361 B2 * | 2/2012 | Avraham et al. | 713/164 |
| 8,194,088 B1 * | 6/2012 | Paquette | 345/545 |
| 8,528,041 B1 | 9/2013 | Haney | |
| 8,793,803 B2 | 7/2014 | Henry et al. | |
| 2001/0000265 A1 * | 4/2001 | Schreiber | G06F 17/211 726/30 |
| 2003/0004827 A1 | 1/2003 | Wang | |
| 2004/0153672 A1 | 8/2004 | Watt et al. | |
| 2004/0177269 A1 | 9/2004 | Belnet et al. | |
| 2005/0033972 A1 | 2/2005 | Watson | |
| 2005/0097341 A1 | 5/2005 | Francis et al. | |
| 2006/0225127 A1 * | 10/2006 | Roberts | G06F 21/57 726/2 |
| 2006/0242517 A1 | 10/2006 | Pedley et al. | |
| 2007/0079111 A1 | 4/2007 | Chen | |
| 2007/0199046 A1 | 8/2007 | O'Brien | |
| 2008/0005790 A1 | 1/2008 | Jirka | |
| 2008/0005794 A1 | 1/2008 | Inoue et al. | |
| 2008/0092145 A1 | 4/2008 | Sun | |
| 2008/0204787 A1 * | 8/2008 | Miyajima | H04N 1/00846 358/1.14 |
| 2008/0209212 A1 | 8/2008 | Ditzman et al. | |
| 2008/0222309 A1 | 9/2008 | Shanbhogue | |
| 2008/0316357 A1 | 12/2008 | Achari et al. | |
| 2009/0210879 A1 | 8/2009 | Kaiser et al. | |
| 2009/0254986 A1 | 10/2009 | Harris et al. | |
| 2009/0307783 A1 * | 12/2009 | Maeda et al. | 726/30 |
| 2009/0320048 A1 | 12/2009 | Watt et al. | |
| 2009/0327552 A1 | 12/2009 | Sundaram et al. | |
| 2010/0031320 A1 * | 2/2010 | Bhesania | G06F 21/83 726/4 |
| 2010/0125904 A1 | 5/2010 | Nice et al. | |
| 2010/0132015 A1 | 5/2010 | Lee et al. | |
| 2011/0003580 A1 | 1/2011 | Belrose et al. | |
| 2011/0065419 A1 * | 3/2011 | Book et al. | 726/24 |
| 2011/0099609 A1 * | 4/2011 | Malhotra et al. | 726/4 |
| 2011/0107426 A1 | 5/2011 | Yen et al. | |
| 2012/0154265 A1 * | 6/2012 | Kim | G06F 21/84 345/156 |
| 2014/0007120 A1 | 1/2014 | Spitz | |
| 2014/0007251 A1 | 1/2014 | Spitz | |
| 2014/0237621 A1 | 8/2014 | Spitz et al. | |
| 2014/0316993 A1 | 10/2014 | Spitz | |

FOREIGN PATENT DOCUMENTS

| | | |
|---|---|---|
| CN | 101211277 | 7/2008 |
| CN | 101299228 | 11/2008 |
| DE | 10 2007 052826 | 5/2009 |
| JP | H01-185734 | 7/1989 |
| JP | H05-265779 | 10/1993 |
| JP | 2003-091612 | 3/2003 |
| JP | 2004-288155 | 10/2004 |
| JP | 2005-108223 | 4/2005 |
| JP | 2006018745 | 1/2006 |
| JP | 2006-506751 | 2/2006 |
| JP | 2006-309760 | 11/2006 |
| JP | 2010-033483 | 2/2010 |
| JP | 2010-129054 | 6/2010 |
| WO | 00/43876 | 7/2000 |
| WO | 01/17296 | 3/2001 |
| WO | 01/75595 | 10/2001 |
| WO | 2005/001666 | 1/2005 |
| WO | 2006/022161 | 3/2006 |
| WO | 2006/029596 | 3/2006 |
| WO | 2007/109145 | 9/2007 |
| WO | 2008/049186 | 5/2008 |
| WO | 2008/106400 | 9/2008 |
| WO | WO 2009/059935 | 5/2009 |
| WO | 2009/071734 | 6/2009 |

OTHER PUBLICATIONS

German Search Report dated Dec. 14, 2011 in DE 10 2011 018 431.7, 5 pages.
Chinese Office Action dated Aug. 6, 2014 in CN 201280018611.8, 8 pages.
English translation of Chinese Second Office Action dated Feb. 10, 2015 in CN 201280018611.8, 9 pages.
Japanese Office Action issued Jun. 2, 2015 in JP 2014-505539 and English translation, 6 pages.
Computer-generated abridged translation of JP-A-2010-033483, 8 pages.
Computer-generated abridged translation of JP-A-2003-091612, 4 pages.
Chinese Third Office Action issued Aug. 4, 2015 in CN 201280018611.8 and English translation, 8 pages.
U.S. Appl. No. 14/001,332, filed Sep. 17, 2013, Inventor: Spitz.
U.S. Appl. No. 14/001,361, filed Sep. 17, 2013, Inventor: Spitz.
U.S. Appl. No. 14/346,811, filed Mar. 24, 2014, Inventor: Spitz et al.
U.S. Appl. No. 14/352,376, filed Apr. 17, 2014, Inventor: Spitz.
Final Office Action mailed Jul. 28, 2015 in co-pending U.S. Appl. No. 14/001,332, 14 pages.
Office Action mailed Mar. 19, 2015 in co-pending U.S. Appl. No. 14/001,332, 14 pages.
Office Action mailed Feb. 12, 2016 in co-pending U.S. Appl. No. 14/001,361, 23 pages.
Office Action mailed Sep. 25, 2015 in co-pending U.S. Appl. No. 14/346,811 13 pages.
Chinese Office Action dated May 19, 2015 in CN 201280010321.9 and English translation, 30 pages.
Chinese Office Action dated Dec. 7, 2015 issued in CN 201280049509.4 and English translation, 17 pages.
English translation of Japanese Office Action dated Feb. 3, 2015 in JP 2013-554811, 5 pages.
Japanese Office Action dated Oct. 30, 2015 issued in JP 2014-533790 and English translation, 10 pages.
German Search Report dated Nov. 7, 2011 in DE 10 2011 012 227.3, 2 pages.
German Search Report dated Jun. 11, 2012 in DE 10 2011 115 135.8, 5 pages.
International Preliminary Report on Patentability mailed Sep. 6, 2013 in PCT/EP2012/000763 and English translation, 14 pages.
International Search Report for PCT/EP2012/000763, mailed Nov. 22, 2012, 3 pages.
Translation of the International Preliminary Report on Patentability mailed May 1, 2014 in PCT/EP2012/004033, 8 pages.
International Search Report for PCT/EP2012/004033 mailed Dec. 12, 2012, 5 pages.
International Search Report for PCT/EP2012/000765, mailed Nov. 5, 2012, 8 pages.
International Preliminary Report on Patentability mailed Sep. 6, 2013 in PCT/EP2012/000765 and English translation, 14 pages.
International Search Report for PCT/EP2012/001700, mailed Sep. 12, 2012, 2 pages.
Foreign-language Written Opinion of the International Searching Authority for PCT/EP2012/001700, mailed Sep. 12, 2012, 6 pages.
International Preliminary Report on Patentability and English translation mailed Apr. 17, 2014 in PCT/EP2012/004159, 18 pages.
International Search Report for PCT/EP2012/004159, mailed Jan. 4, 2013, 3 pages.
D. Li et al, "A High-efficient Inter-Domain Data Transferring System for Virtual Machines" Proceedings of the 3$^{rd}$ International Conference on Ubiquitous Information Management and Communication, Jan. 2009, pp. 385-390.

(56) References Cited

OTHER PUBLICATIONS

X. Zhang et al, "XenSocket: A High-Throughput Interdomain Transport for Virtual Machines" Proceedings of the ACM/IFIP/USENIX 2007 International Conference on Middleware, Nov. 2007, pp. 184-203.
Sepia, "Secure Embedded Platform with Advanced Process Isolation and Anonymity capabilities" May 2011, Revision 0.5, 44 pages.
Secunet, "Towards a Secure Automotive Platform" Aug. 2009, White Paper, pp. 1-16.
Arm "Securing the System with TrustZone® Ready Program" 2010, pp. 1-22.
S. Suh, "Secure Xen on ARM: Status and Driver Domain Separation" Samsung Electronics, Aug. 2007, pp. 1-21.
Dietrich et al., "Towards Customizable, Application Specific Mobile Trusted Modules", *Proceedings of the Fifth ACM Workshop on Scalable Trusting Computing, STC '10*, Jan. 1, 2010, 10 pages.
[Online] Giesecke & Devrient, Mobicore—Giesecke & Devrient's Secure OS for ARM TrustZone Technology (White Paper), 2010, retrieved Nov. 27, 2012, URL:http://www.gi-de.com/gd_media/media/en/documents/brochures/mobile_security_2/Mob 8 pages.
ARM, "ARM Security Technology, Building a Secure System using TrustZone Technology" Apr. 2009, pp. 1-108.
ARM, "The architecture of the digital world" Dec. 2, 2010, pp. 1-9.
Wei Huang et al., "Virtual machine aware communication libraries for high performance computing", *Proceedings of the 2007 ACM/IEEE Conference on Supercomputing*, Nov. 10, 2007, pp. 1-12.
ARM, White Paper "Designing with TrustZone—Hardware Requirements", (Aug. 10, 2005), pp. 1-10.
Xu et al., "Design and Implementation of Secure Embedded Systems Based on Trustzone", The 2008 International Conference on Embedded Software and Systems (ICESS2008) (Jul. 29, 2008), pp. 136-141.
Final Office Action mailed May 25, 2016 in co-pending U.S. Appl. No. 14/346,811, 16 pages.

\* cited by examiner

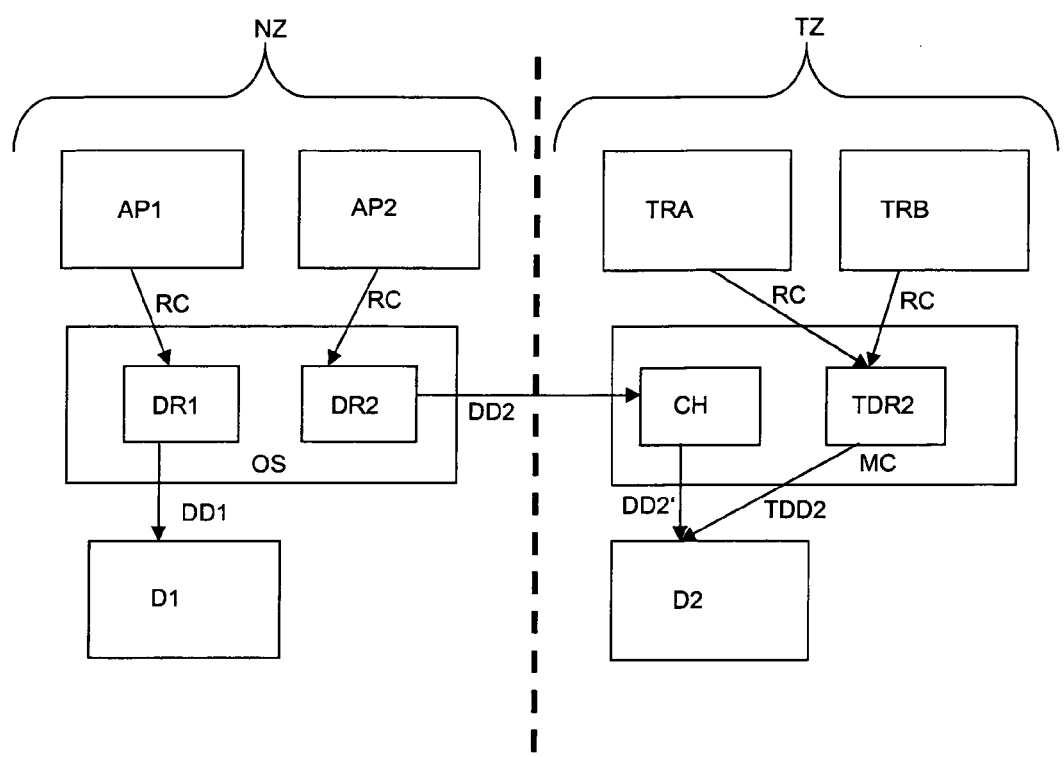

METHOD FOR DISPLAYING INFORMATION ON A DISPLAY DEVICE OF A TERMINAL

This application is the U.S. national phase of International Application No. PCT/EP2012/001700, filed 19 Apr. 2012, which designated the U.S. and claims priority to DE Patent Application No. 10 2011 018 431.7, filed 21 Apr. 2011, the entire contents of each of which are hereby incorporated by reference.

The invention relates to a method for displaying information on a display device of a terminal, particularly of a mobile terminal, and also to an appropriate terminal.

The prior art discloses the practice of implementing in a microprocessor unit of a terminal not only a normal, not separately protected runtime environment but also a protected runtime environment that is isolated from the normal runtime environment and is used for executing security-critical applications. An example of such a protected runtime environment is the ARM® TrustZone® known from the prior art. In this case, this TrustZone has a separate operating system running inside it, such as the likewise known Mobi-Core® operating system.

In order for a user to communicate with an appropriate application in the protected runtime environment, a display device provided in the terminal is usually used, with a separate display or a separate display area being able to be provided as a user interface for applications from the Trust-Zone, for example. In this case, one problem with the use of a protected runtime environment in parallel with a normal runtime environment is how a user can be provided with an indication—in a manner that is protected against manipulation as much as possible—of the fact that he is currently communicating with a trustworthy application from the protected runtime environment. In particular, the aim in this case is to prevent attacks that use a manipulated application from the normal runtime environment to lead a user to believe that he is communicating with the protected runtime environment. In this case, appropriate input requests can be used by unauthorized third parties to tap off user-related data, such as passwords, PINs and the like.

The prior art discloses the practice of equipping terminals with a plurality of display elements. The document DE 2009 022 222 A1 describes a terminal having two separately drivable display elements, one of the display elements being connected to a security element. This display element is used to reproduce trustworthy information. The document DE 60 2004 007 152 T2 discloses a multilayer display for a terminal, the multilayer display being used to superimpose several pieces of information.

It is an object of the invention to reproduce information on a display device of a terminal such that a user is provided with an indication—in a manner protected against manipulation—of whether the information is trustworthy.

This object is achieved by the method according to patent claim 1 and the terminal according to patent claim 12. Developments of the invention are defined in the dependent claims.

The inventive method is used for displaying information on a display device of a terminal, which is particularly a mobile terminal, such as a mobile telephone, a PDA or the like. The terminal contains a microprocessor unit in which a normal runtime environment and a protected runtime environment are implemented, wherein display data for reproduction on the display device can be provided via the normal runtime environment and the protected runtime environment.

The inventive method is distinguished in that display data provided via the normal runtime environment are transferred at least in part to the protected runtime environment, which checks whether the transferred display data meet one or more security criteria. The security criteria may be of arbitrary design. They merely need to ensure that when the security criteria are met it is possible for a user to trust the display data as not having been manipulated without authorization. If the display data do not meet at least one security criterion, one variant of the invention involves the display data being rejected, i.e. not being displayed on the display device at all. Likewise, it is possible for the display data to be altered such that the user is able to distinguish them from display data provided via the protected runtime environment during the subsequent reproduction on the display device. This ensures that, even in the case of manipulated applications, a user is rendered able to recognize whether the application is being executed in the normal or the protected runtime environment.

The inventive method has the advantage that a display device can be used both by a protected runtime environment and by a normal runtime environment, it being simultaneously ensured that the check on appropriate security criteria can recognize applications that have been manipulated without authorization. In one preferred embodiment, the display data transferred to the protected runtime environment are reproduced on the display device without alteration if they meet the security criterion or security criteria (i.e. all security criteria).

In one particularly preferred embodiment, the security criterion or security criteria described above comprise(s) the criterion that the transferred display data are distinguishable from display data provided via the protected runtime environment during the reproduction of said display data on the display device. That is to say that if the data are distinguishable then this security criterion is met. In this variant of the invention, the lack of trustworthiness of information is coupled directly to the feigning of a protected runtime environment on the basis of display data from the normal runtime environment.

In one particularly preferred embodiment, the inventive method is used in a terminal having a display device that comprises a first display element and a second display element. In this case, the first display element is used to reproduce exclusively display data provided by the normal runtime environment. Usually, the first display element is larger than the second display element in this case. By contrast, the second display element is used within the context of the invention to reproduce both display data provided by the protected runtime environment and display data provided by the normal runtime environment. In this case, the display data provided by the normal runtime environment, which are provided for the purpose of reproduction on the second display element, are transferred to the protected runtime environment and are subjected to the inventive check on the security criteria. In this way, it is possible for a (second) display element that is normally used only by the protected runtime environment also to be used for applications from the normal runtime environment, with the check on the above security criteria preventing misuse.

The first and second display elements may possibly be two separately driven displays. Similarly, there is possibly the option of the first and second display elements being two display areas on a single display.

In one particularly preferred embodiment of the invention, the protected runtime environment used is the inherently known ARM® TrustZone® on which preferably the likewise known MobiCore® operating system runs. In a further variant of the invention, the terminal is a mobile telephone, with the operating system of the mobile telephone running on the normal runtime environment. In particular, the mobile telephone is what is known as a smartphone, which uses an operating system with an extended scope of functions (also called a rich OS).

When the inventive method involves the display data transferred to the protected runtime environment being altered in the event of at least one security criterion not being met, the alteration can be made in various ways, it merely being necessary to ensure that a user is able to recognize that the display data have not been provided via the protected runtime environment. This can be achieved by adding a warning message to the display data, for example. This warning message points out to the user that the display data are attempting to lead one to believe that they are provided by the protected runtime environment, even though this is not the case. A further way of altering the display data transferred to the protected runtime environment may involve one or more predetermined graphical elements that the transferred display data contain and that render a user able to recognize that display data reproduced on the display device are provided by the protected runtime environment being modified or removed from the display data.

In a further, particularly preferred embodiment, the above security criteria are checked on the basis of a graphical analysis of the display data. In this case, the protected runtime environment analyzes the transferred display data to determine whether they contain one or more predetermined graphical elements that render a user able to recognize that display data reproduced on the display device are provided by the protected runtime environment, wherein at least one security criterion is not met if the display data comprise the predetermined graphical element(s).

The graphical elements described above that are modified or removed from the display data or are processed as part of the graphical analysis may be of arbitrary design. By way of example, they may be a predetermined frame, particularly in a predetermined color (e.g. red). Similarly, the graphical elements may comprise one or more animated image elements and/or a legend, such as the legend "TrustZone active".

The check on security criteria that is performed by the protected runtime environment may possibly also comprise a cryptographical check. In this case, the term cryptographical check can be understood broadly. In particular, the cryptographical check also comprises the check on one or more digital signatures that the display data transferred to the protected runtime environment contain. In this case, the signature check may be designed such that if the signature(s) is/are valid and/or trustworthy then the relevant security criterion is met. In particular, there is the option for the cryptographical check to involve a check on one or more graphical elements in the transferred display data. Preferably, this involves a check on one or more digital signatures that are respectively associated with a graphical element in the display data. In this case, the check may again be designed such that if the signature is classified as valid and/or trustworthy then the security criterion is met.

Besides the method described above, the invention also relates to a terminal, particularly a mobile terminal. This terminal comprises a microprocessor unit, in which a normal runtime environment and a protected runtime environment are implemented, and also a display device, wherein display data for reproduction on the display device can be provided via the normal runtime environment and the protected runtime environment. In this case, the terminal is designed such that display data provided via the normal runtime environment are transferred at least in part to the protected runtime environment, which checks whether the transferred display data meet one or more security criteria, wherein if the display data do not meet at least one security criterion then they are rejected or altered such that a user is able to distinguish them from display data provided via the protected runtime environment during the subsequent reproduction on the display device. In this case, the inventive terminal is preferably designed such that the terminal can be used to perform one or more variants of the inventive method described above.

An exemplary embodiment of the invention is described in detail below with reference to the appended FIG. 1. This FIGURE shows a schematic illustration of a sequence for an embodiment of the inventive method.

The text below describes an exemplary embodiment of the inventive method on the basis of a terminal in the form of a mobile telephone with a display device in the form of two display elements or displays. The displays and the hardware thereof are schematically denoted by D1 and D2 in FIG. 1. The microcontroller installed in the mobile telephone has a normal runtime environment NZ and a protected runtime environment TZ in the form of what is known as an ARM® TrustZone® implemented in it. In the embodiment described here, the MobiCore® operating system known from the prior art, and denoted by MC in FIG. 1, runs on the TrustZone. By contrast, the normal runtime environment contains a conventional mobile telephone operating system OS. If the mobile telephone is a smartphone, the operating system is what is known as a rich OS with an extensive scope of functions. The TrustZone TZ is used for executing security-critical applications using the mobile telephone, for example for performing payment transactions or bank applications or other applications in which personal user-specific data are processed. In this case, the protected runtime environment is isolated from the normal runtime environment and encapsulates security-critical processes, which achieves efficient protection against attacks from unauthorized third parties. The security-critical applications running within the TrustZone TZ are called trustlets, with the trustlets TRA and TRB being reproduced in FIG. 1 by way of example. By contrast, conventional applications denoted by AP1 and AP2 in FIG. 1 by way of example run in the normal runtime environment NZ.

In order to allow the trustlets to interact with a user, the display D2 in the mobile telephone is used, from which a user can read off appropriate outputs from the trustlets and on which said user can also make inputs using a keypad. In this case, the user is provided with a graphical indication of the fact that the application that is currently running comes from the protected runtime environment, this being accomplished in the embodiment described here by means of a frame that is reproduced on the display and that is presented particularly in a specific color, such as red. There are possibly also other options for pointing out to the user, graphically by means of the display D2, that he is currently communicating with an application in the TrustZone. In particular, specific images or icons, such as animated icons, can be used for trustlets, or the display can be used to reproduce a legend that points out that the display indication relates to an application in the TrustZone. By way of example, this can be achieved by legends such as "TrustZone active" or "protected display".

Usually, the display D2 is much smaller than the display D1, since the trustlets in the TrustZone are usually used to process and display smaller volumes of data. The invention now provides the option for the smaller display D2 also to be used for communication by applications from the normal runtime environment NZ. By way of example, the display D2 can be used by applications that reproduce short status messages or other short information, such as short messages. Further examples are the display of MP3 player software, the display that a new email or SMS has been received, or the like. In this case, it is no longer necessary for the large display D1 to be kept in operation for reproducing these small volumes of information. This results in low power consumption and hence in a longer battery life for the mobile telephone.

In order to communicate to the user that a relevant application reproduced on the display D2 does not come from the TrustZone, the appropriate markers or graphical elements that indicate the use of a trustlet on a display (such as the red frame described above) are omitted for application in the normal runtime environment NZ. In this case, however, there is the problem that the access to the display D2 via the normal runtime environment using a manipulated application can lead one to believe that the application is running in the TrustZone, even though this is not the case. The manipulated application can ask the user, who thinks that he is securely communicating with a trustlet, to input personal information, such as passwords or PINs, which is then tapped off by the manipulated application. In order to counteract this type of attack, the invention involves a check being performed within the TrustZone TZ on the display data from the normal runtime environment that are intended to be reproduced on the display D2, as explained in more detail further below.

In the scenario in FIG. 1, the application AP1 in the normal runtime environment NZ interacts with the larger display D1. To this end, appropriate render commands RC are sent to a display renderer DR1 that is responsible for the display D1, which display renderer converts the commands into pixel-based display data DD1 that are displayed on the display D1. Similarly, a separate trustworthy display renderer TDR2 is used for reproducing display data from the trustlets TRA and TRB in the TrustZone TZ. The relevant render commands RC from the trustlets TRA and TRB are converted by this renderer into pixel-based display data, which are then reproduced on the display D2. In this case, the renderer TDR2 adds the appropriate elements (e.g. the red frame mentioned above) that can be used to recognize that the display data come from the TrustZone. The application AP2 is distinguished from the application AP1 in that the display data produced are intended to be reproduced on the smaller display D2. To this end, an appropriate display renderer DR2 is used that converts the render commands from the application AP2 into pixel-based display data DD2 that are intended for the display D2.

In order to protect against the aforementioned manipulated applications that use the display data DD2 to feign an active TrustZone, the display data DD2 are transferred to an algorithm CH within the MobiCore operating system MC, which algorithm checks these data. For this purpose, the MobiCore operating system knows the way in which an active TrustZone is displayed on the display D2. This can be accomplished by the red frame in the display D2, for example, which has already been described above. In this case, the algorithm CH checks the display data DD2 intended for display on the display D2 graphically to determine whether there is a red frame around the information to be displayed. Such a check does not require any complex algorithms in the image recognition and can therefore easily be implemented on a mobile telephone with limited resources.

If the algorithm CH now recognizes that the display data DD2 contain a red frame or a similar presentation, this frame is removed from the pixel data DD2 at least in part prior to the display or is altered such that there is no longer any risk of the user of the display D2 confusing it with the red frame of the TrustZone. By way of example, this can be achieved by decreasing the proportion of red in the marginal area of the display D2, so that the frame no longer appears in red color. In this way, the user of the mobile telephone is informed that the application is not running in the TrustZone, as a result of which the user knows that he should preferably not input any personal data during the interaction with the application, even if asked for such data. The pixel data that are accordingly altered and then displayed on the display D2 are denoted by DD2' in FIG. 1 in this instance. To increase security further, the algorithm CH can possibly also reject the pixel data completely and/or show a warning of a possible attack in the display D2, as a result of which it is explicitly pointed out to the user that he should preferably not input any personal data while using the application.

Instead of indicating an active TrustZone using a red frame, this can also be accomplished by using static or animated images, as has already been mentioned above. In today's operating systems on mobile telephones, the images or animations used are stored as icons and are not copied to the relevant graphics memory until the window content is rendered (i.e. drawn). The icons are usually produced not at the execution time of the application but rather during the actual software development or software writing for the relevant application. If an active TrustZone is now pointed out by animated icons, the graphical check on whether relevant display data DD2 contain such icons for feigning a TrustZone is much more difficult than in the case of simpler elements such as the red frame described above. In particular, this requires complex analysis algorithms on the part of the TrustZone in order to determine similarities for the human eye.

In one modified embodiment, the graphical check on icons is therefore replaced by a signature check. In this case, the icons transmitted from the normal runtime environment to the TrustZone have a digital signature that has been introduced during the actual development of the software for the relevant application. If an icon within the display data DD2 has such a digital signature, only this signature is checked by the TrustZone before the icon is displayed on the display D2. If the signature of the individual icons is then recognized as valid or trustworthy, the display data, including the icons, are reproduced without alteration, since in this case the application is classified as trustworthy. So that the digital signature needs to be checked as rarely as possible, the TrustZone can store the icon itself or a hash value for the icon that the TrustZone itself has calculated in a cache. If one or more icons do not have a digital signature, the display data can either be presented on the display D2 not at all or a graphical check on the icons is subsequently performed to determine whether they are icons that are supposed to feign an active TrustZone. If this is the case, the icons are removed from the display data or a warning message is output, as a result of which the user is informed that the application is not running in the protected runtime environment.

The embodiment of the invention that has been described with reference to FIG. 1 has been explained on the basis of two separately driven displays D1 and D2. However, the invention can also be applied to terminals in which the display D2 is used together with the larger display D1. That is to say that the two displays are two display areas within a common large display. In this case, the operating system OS in the normal runtime environment with appropriate drivers takes care of rendering the data that are to be presented. From the point of view of the individual applications, there is then only a single display.

The embodiment of the invention that has been described above has a series of advantages. In particular, display data from applications from an unprotected normal runtime environment are also able to be reproduced within a display area that is provided per se for the protected runtime environment. This ensures that a user can safely and easily recognize whether the application currently being used is running on the TrustZone or is trustworthy. The feigning of an active TrustZone by an application from the normal runtime environment is achieved by means of a graphical check on the display data or possibly also by means of the check on signatures. According to the invention, no additional elements, such as an LED or the like, are required in order to indicate on the terminal that the TrustZone is currently active.

LIST OF REFERENCE SYMBOLS

NZ Normal runtime environment
TZ Protected runtime environment
AP1, AP2 Applications in the normal runtime environment
TRA, TRB Trustlets
RC Render commands
DR1, DR2, TDR2 Display renderer
CH Checking algorithm
DD1, DD2, DD2', TDD2 Display data
OS Operating system in the normal runtime environment
MC MobiCore operating system
D1, D2 Displays

The invention claimed is:

1. A method for displaying information on a display device of a terminal, wherein the terminal contains a microprocessor in which a normal runtime environment and a protected runtime environment are implemented, wherein the normal runtime environment and the protected runtime environment are configured, when implemented on the microprocessor to provide display data for reproduction on the display device, the method comprising:
   transferring display data provided via the normal runtime environment at least in part to the protected runtime environment,
   the protected runtime environment checking whether the transferred display data meet one or more security criteria, and
   rejecting or altering the transferred display data when the transferred display data do not meet at least one security criterion that the transferred display data are visually distinguishable from display data provided via the protected runtime environment during subsequent reproduction on the display device,
   wherein the protected runtime environment graphically analyzes the transferred display data to determine whether the display data contains one or more predetermined graphical elements that render a user able to recognize that display data reproduced on the display device are provided by the protected runtime environment, and wherein at least one security criterion is not met if the display data comprise the predetermined graphical element(s).

2. The method as claimed in claim 1, wherein the display device comprises a first display element and a second display element, wherein the first display element is used to reproduce exclusively display data provided by the normal runtime environment, and wherein the second display element is used to reproduce both display data provided by the protected runtime environment and transferred display data provided by the normal runtime environment that have previously been transferred to the protected runtime environment and subjected to the check on the security criterion or security criteria.

3. The method as claimed in claim 2, wherein the first and second display elements are two separately driven displays.

4. The method as claimed in claim 2, wherein the first and second display elements are two display areas on a single display.

5. The method as claimed in claim 1, wherein the protected runtime environment is an ARM® TrustZone® on which the operating system MobiCore® runs.

6. The method as claimed in claim 1, wherein the terminal is a mobile telephone and the operating system of the mobile telephone runs on the normal runtime environment.

7. The method as claimed in claim 1, wherein if at least one security criterion is not met, then the protected runtime environment alters the display data transferred thereto such that the transferred display data have a warning message added to them.

8. The method as claimed in claim 1, wherein if at least one security criterion is not met, then the protected runtime environment alters the transferred display data such that one or more predetermined graphical elements that the transferred display data contain and that render a user able to recognize that display data reproduced on the display device are provided via the protected runtime environment is/are modified or removed from the display data.

9. The method as claimed in claim 1, wherein the graphical element(s) comprise(s) a predetermined frame and/or one or more animated image elements and/or a legend.

10. The method as claimed in claim 1, wherein the check on the security criterion or security criteria by the protected runtime environment comprises a cryptographical check, wherein the cryptographical check preferably comprises a check on one or more digital signatures that the transferred display data contain.

11. The method as claimed in claim 10, wherein the cryptographical check is performed for one or more graphical elements in the transferred display data, wherein particularly one or more digital signatures that are respectively associated with a graphical element in the display data is/are checked.

12. A terminal, comprising:
   a microprocessor configured to implement a normal runtime environment and a protected runtime environment, and
   a display device,
   wherein the microprocessor is configured to provide display data for reproduction on the display device via the normal runtime environment and the protected runtime environment,
   wherein the terminal is configured to:
      transfer display data provided via the normal runtime environment at least in part to the protected runtime environment,
      check whether the transferred display data meet one or more security criteria, and
      reject or alter the transferred display data when the transferred display data do not meet the one or more security criteria that make the transferred display data visually distinguishable from display data provided via the protected runtime environment during subsequent reproduction on the display device,
wherein when implemented by the microprocessor, the protected runtime environment graphically analyzes the transferred display data to determine whether the display data contains one or more predetermined graphical elements that render a user able to recognize that display data reproduced on the display device are provided by the protected runtime environment, and wherein at least one security criterion is not met if the display data comprise the predetermined graphical element(s).

* * * * *